Patented Nov. 9, 1926.

1,606,490

UNITED STATES PATENT OFFICE.

FREDERICK WYNKOOP, OF PHILADELPHIA, PENNSYLVANIA.

ARTIFICIAL SOAPSTONE.

No Drawing. Application filed April 23, 1925. Serial No. 25,413.

My present invention relates to an improved artificial soap stone, or composition of matter for use in the manufacture of tubs and trays, tanks for septic or other use, tiles, flooring, specially molded articles, etc.

The principal object of the invention is to provide an improved artificial soap stone which is inexpensive, is capable of ready and accurate molding, which may be easily cut, drilled or grooved, or otherwise machined, and which will have very low absorption characteristics.

A further object of the invention is to provide an improved artificial soap stone which, in the finished articles, will closely simulate the natural soap stone in color and appearance.

In carrying out my invention, I thoroughly mix crushed soap stone and a high alumina cement, essentially a calcium aluminate, together in a dry state, and to this mixture I add water, again mix and pour into molds. The high alumina cement which I use, contains substantially the following ingredients, namely,—2% to 5% silica; 38% to 42% alumina; 38% to 42% calcium oxide; 12% to 14% ferric oxide; with small amounts of magnesia, and loss on ignition. The material is essentially a calcium aluminate, to which compound it owes its cementitious properties.

In making tubs, tiles, etc., I have used one part of the high alumina cement, to four parts crushed soap stone, and one part high alumina cement to five parts soap stone. The ingredients were mixed thoroughly while dry, and then sixteen to twenty per cent water was added, the batch again mixed, and cast in molds.

The resultant product I have found, may be readily worked with tools, or machined with a facility comparable to natural soap stone, and has a higher tensile strength and is harder than any compound using soap stone in any considerable amount, heretofore made, with which I am familiar. I have also found, by tests, that the product is of very low absorption, about 4%, and this I attribute to the peculiar structural characteristics of the mixture, which I attribute to an actual reaction between the very fine calcium aluminate and the particles of soapstone, producing a very compact matrix almost colloidal in character, which under the microscope contains a much lower proportion of voids than any other mixture of soapstone with any type of cement of which I have knowledge.

The low absorption of the molded products made according to my invention, render them admirably suited for use as tubs, trays, tanks, etc., and far superior to any artificial soap stone combination of which I have knowledge. Furthermore, artificial soap stone combinations heretofore made with which I am familiar, have been too brittle to permit of being properly worked by tools or machined, and either crumble under a tool or the particles of stone pulled from the matrix.

I have also found that the composition can be so colored that the products made from it, after grinding and smoothing, imitate the blue gray natural color of soap stone so closely as to be hardly distinguishable from it. I attain this color by adding ultramarine blue in proper quantities. Excellent results have been obtained by adding from 1½% to 2% by weight ultramarine blue, to a mixture of approximately 80% crushed soap stone, and 20% high alumina cement. I have also found that a rule which may be safely followed, whatever proportion of soap stone and high alumina cement are used, is to use the blue in proportions of 7% to 10% by weight of the high alumina cement.

I am aware that crushed soap stone has heretofore been used with other ingredients in making artificial stone, but so far as I know, I am the first to discover that a molded product of comparatively high tensile strength and hardness, and of extremely low absorption, and capable of being readily worked with tools and machined, may be made from an admixture of crushed soap stone, and a cement having a high alumina content, as set out above.

The foregoing description has been given for clearness of understanding, and no undue limitations should be deduced therefrom, but the appended claims should be construed as broadly as permissible, in view of the prior art.

Having thus described my invention what I claim as new and desire to secure by Letters Patent is,—

1. Artificial soap stone comprising an admixture of approximately 80% to 85% crushed soap stone, with approximately 20% to 15% cement having a content of approximately 38% to 42% alumina, and containing approximately 2% to 5% silica, approximately 38% to 42% calcium oxide, approximately 12% to 14% ferric oxide, and small amounts of magnesia.

2. An artificial soapstone comprising an admixture of approximately 80% to 85% soapstone with approximately 20% to 15% cement having a high alumina content.

3. An artificial soapstone of high tensile strength and low absorption comprising an admixture of soapstone and a cement of high alumina content.

4. Artificial soap stone comprising an admixture of crushed soap stone with a cement having a content of approximately 38% to 42% alumina the soapstone constituting the major portion of the admixture.

5. Artificial soap stone comprising an admixture of approximately 80% soap stone with approximately 20% cement having a content of 38% to 42% alumina.

6. Artificial soap stone comprising an admixture of soap stone with a cement having a high alumina content and containing silica, calcium oxide, ferric oxide and magnesia the soapstone constituting the major portion of the admixture.

7. Artificial soap stone comprising an admixture of crushed soap stone and a cement having a high alumina content the soapstone constituting the major portion of the admixture.

8. A colored artificial soap stone comprising an admixture of soap stone, a cement having a high alumina content, and a coloring matter, the soapstone and cement being in the proportion of approximately five to six parts of soapstone to one part of cement and the coloring matter constituting from 1½% to 2% of the admixture.

9. An artificial soap stone simulating natural soap stone in color and having substantially the working qualities of natural soapstone, comprising an admixture of soap stone, a cement having a high alumina content, and ultramarine blue.

10. An artificial soap stone having the working qualities of natural soap stone comprising an admixture of soap stone and a cement high in alumina content.

In testimony whereof I hereunto affix my signature.

FREDERICK WYNKOOP.